US 10,507,511 B2

(12) United States Patent
Sakaguchi et al.

(10) Patent No.: US 10,507,511 B2
(45) Date of Patent: Dec. 17, 2019

(54) FIN STACKING APPARATUS

(71) Applicant: Mitsubishi Electric Corporation, Tokyo (JP)

(72) Inventors: Noritaka Sakaguchi, Tokyo (JP); Junichi Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/781,497

(22) PCT Filed: Feb. 8, 2016

(86) PCT No.: PCT/JP2016/053637
§ 371 (c)(1),
(2) Date: Jun. 5, 2018

(87) PCT Pub. No.: WO2017/138064
PCT Pub. Date: Aug. 17, 2017

(65) Prior Publication Data
US 2018/0326471 A1    Nov. 15, 2018

(51) Int. Cl.
*B21D 43/18*    (2006.01)
*B21D 43/22*    (2006.01)
(Continued)

(52) U.S. Cl.
CPC ............. *B21D 43/18* (2013.01); *B21D 43/22* (2013.01); *B23P 15/26* (2013.01); *B65G 57/04* (2013.01); *F28F 1/32* (2013.01)

(58) Field of Classification Search
CPC .......... B23P 15/26; B23P 21/00; B65H 29/22; B21D 43/18; B21D 43/22; F28F 1/32;
(Continued)

(56) References Cited

U.S. PATENT DOCUMENTS 1,484,600 A * 2/1924 Witte ..................... B21D 53/04
                                                            72/130
3,101,638 A * 8/1963 Rhicard ................. B21D 43/22
                                                            83/162
(Continued)

FOREIGN PATENT DOCUMENTS

JP    S64-014755 U    1/1989
JP    04-017333 U1    2/1992
(Continued)

OTHER PUBLICATIONS

International Search Report of the International Searching Authority dated Mar. 15, 2016 for the corresponding International application No. PCT/JP2016/053637 (and English translation).
(Continued)

*Primary Examiner* — Lynn E Schwenning
(74) *Attorney, Agent, or Firm* — Posz Law Group, PLC

(57) ABSTRACT

Provided is a fin stacking apparatus, which is configured to stack a fin having a flat-plate shape and a plurality of holes formed therein. The fin stacking apparatus includes: a plurality of stacking pins to be inserted into the plurality of holes of the fin; a suction plate which is arranged above the plurality of stacking pins and is configured to suck the fin through a plurality of holes formed in the suction plate; and a roller arranged in a slide region on the suction plate where a flat surface portion of the fin moves.

6 Claims, 8 Drawing Sheets

(51) Int. Cl.
*B65G 57/04* (2006.01)
*F28F 1/32* (2006.01)
*B23P 15/26* (2006.01)

(58) Field of Classification Search
CPC .......... B65G 57/04; B65G 57/03; B25J 15/06; B25J 15/0608; B25J 15/0616
USPC .................................... 271/10.09, 93, 11, 16
See application file for complete search history.

(56) References Cited

U.S. PATENT DOCUMENTS

| | | | | |
|---|---|---|---|---|
| 3,258,097 A | * | 6/1966 | Wahl | B65G 39/02 |
| | | | | 193/37 |
| 3,661,381 A | * | 5/1972 | Kuzniak | B65G 21/2036 |
| | | | | 221/211 |
| 4,059,263 A | * | 11/1977 | Henc | B65H 1/06 |
| | | | | 271/132 |
| 4,422,543 A | * | 12/1983 | Stubbings | B65G 39/02 |
| | | | | 193/35 C |
| 4,443,006 A | * | 4/1984 | Hasegawa | B65H 3/063 |
| | | | | 271/10.11 |
| 4,815,723 A | * | 3/1989 | Iizuka | B65H 3/0808 |
| | | | | 271/107 |
| 5,033,610 A | * | 7/1991 | Lehmler | B21D 43/023 |
| | | | | 198/782 |
| 5,050,852 A | * | 9/1991 | Sawada | B65H 3/063 |
| | | | | 271/11 |
| 7,475,875 B2 | * | 1/2009 | Lassen | B65H 3/0816 |
| | | | | 271/11 |
| 2004/0247422 A1 | * | 12/2004 | Neumann | B65D 88/129 |
| | | | | 414/529 |
| 2013/0170934 A1 | * | 7/2013 | Parsons | B23K 37/00 |
| | | | | 414/535 |

FOREIGN PATENT DOCUMENTS

| | | |
|---|---|---|
| JP | 07-015648 U | 3/1995 |
| JP | 2007-008598 A | 1/2007 |

OTHER PUBLICATIONS

Office Action dated Sep. 3, 2019 issued in corresponding CN patent application No. 201680080290.2 (and English translation).

* cited by examiner

FIN STACKING APPARATUS

CROSS REFERENCE TO RELATED APPLICATION

This application is a U.S. national stage application of PCT/JP2016/053637 filed on Feb. 8, 2016, the contents of which are incorporated herein by reference.

TECHNICAL FIELD

The present invention relates to a fin stacking apparatus configured to move and stack a fin for a heat exchanger.

BACKGROUND ART

The term "fin stacking" refers to an action of receiving a fin, which is conveyed from a press machine, through penetration of stacking pins into the fin to stack the fins. The fin stacking is summarized herebelow. A fin having been delivered from a press machine moves on a suction plate, which has a plurality of holes formed therein, while being sucked by the suction plate. After the movement of the fin, the suction plate moves up and down. Along with the up and down movement of the suction plate, the fin is cut by a cutter arranged near an outlet of the press machine, and the fin falls. The fallen fin is received with so-called stacking pins which are bars each having a needle-shaped tip, and fins are sequentially stacked. In a related-art fin stacking apparatus, a fin is moved by a plate, which has a plurality of holes formed therein and is configured to suck the fin (for example, see Patent Literature 1).

CITATION LIST

Patent Literature

Patent Literature 1: Japanese Unexamined Patent Application Publication No. Hei 4-17333

SUMMARY OF INVENTION

Technical Problem

In the fin stacking apparatus disclosed in Patent Literature 1, when the suction plate sucks a fin to move the fin, there may occur a phenomenon which is called buckling, in which the fin is bent in the course of movement. When the fin moves on the suction plate, a frictional force is generated between the suction plate and the fin. The fin is moved by a pushing force from the press machine, thus a part of the plate with the generated frictional force cannot move further. As a result, there is a case where the fin is bent between a driving point and a point of action of the frictional force.

The present invention has been made to solve the above-mentioned problem, and has an object to provide a fin stacking apparatus capable of moving a fin without causing buckling when the fin moves on a suction plate.

Solution to Problem

According to one embodiment of the present invention, there is provided a fin stacking apparatus, which is configured to stack a fin having a flat-plate shape and a plurality of holes formed therein, including: a plurality of stacking pins to be inserted into the plurality of holes of the fin; a suction plate which is arranged above the plurality of stacking pins and is configured to suck the fin through a plurality of holes formed in the suction plate; and a roller arranged in a slide region on the suction plate where a flat surface portion of the fin moves.

Advantageous Effects of Invention

According to the fin stacking apparatus of one embodiment of the present invention, the roller is provided in the region where the flat surface portion of the fin moves and slides. Thus, a frictional force to be generated between the fin, which moves on the suction plate, and the suction plate can be reduced, thereby being capable of moving the fin without causing buckling.

DESCRIPTION OF EMBODIMENTS

Embodiment 1

Figure 1:
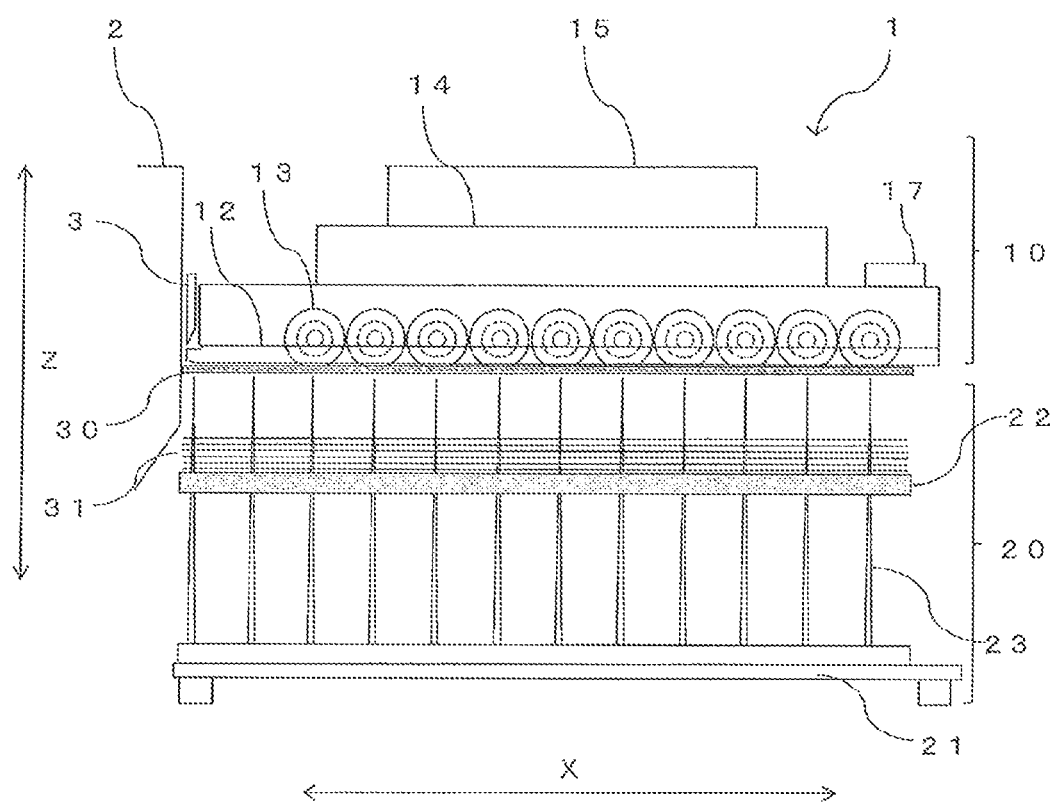
FIG. 1 is a front view of a fin stacking apparatus according to Embodiment 1 of the present invention.

FIG. 1 is a front view of a fin stacking apparatus according to Embodiment 1 of the present invention. A fin stacking apparatus 1 includes a fin stacking unit 20 and a suction unit 10 which is arranged above the fin stacking unit 20 in a Z-axis. The fin stacking unit 20 includes a base 21, an elevator 22, and a plurality of stacking pins 23. The stacking pins 23 are installed on the base 21 so as to penetrate through the elevator 22 and have respective tips thereof oriented upward in the Z-axis. The suction unit 10 includes a suction plate 12, rollers 13, a suction box 14, and a blower 15. The suction box 14 is arranged on the suction plate 12. The blower 15 is arranged on the suction box 14.

The suction plate 12 has a plurality of holes for sucking a fin 30. Further, the suction plate 12 has a plurality of holes for bringing the rollers 13 into contact with the fin 30. The suction box 14 is arranged on the suction plate 12 to cause suction by the blower 15, which is arranged on the suction box 14, to act entirely on the suction plate 12. The elevator 22 is positioned around upper portions of the stacking pins 23, and fallen fins 30 are sequentially stacked on the elevator 22. At this time, an uppermost surface of stacked fins 31 is detected by a sensor (not shown), and the elevator 22 is lowered so as to maintain the uppermost surface at a certain position.

Figure 2:
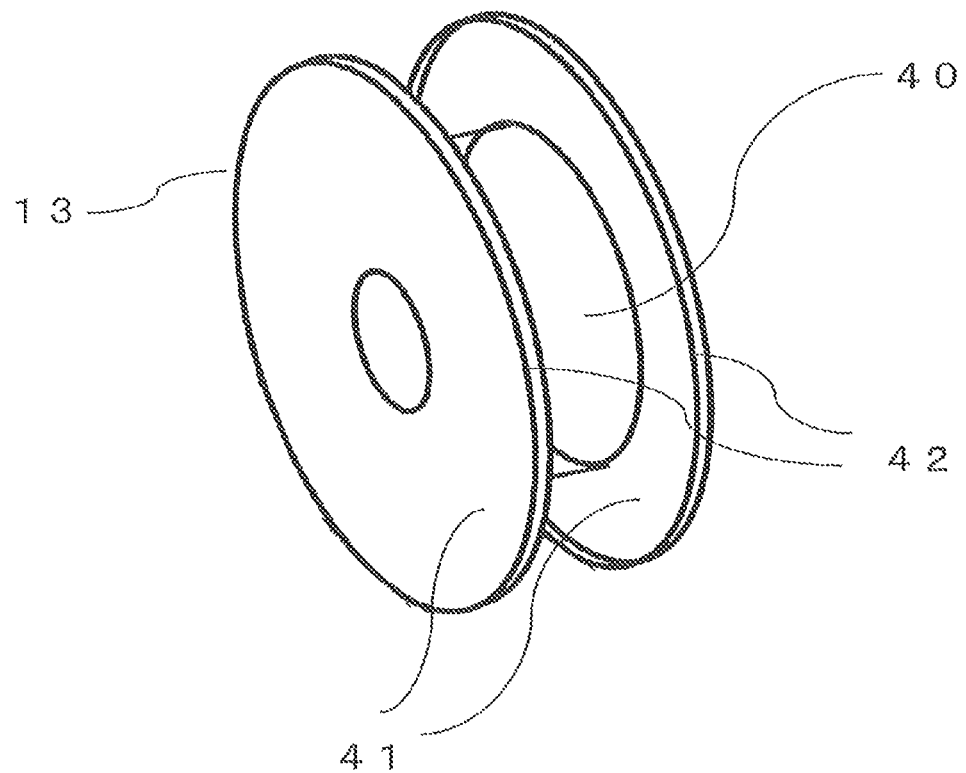
FIG. 2 is a perspective view of a roller of the fin stacking apparatus according to Embodiment 1 of the present invention.

FIG. 2 is a perspective view of the roller of the fin stacking apparatus according to Embodiment 1 of the present invention. The roller 13 includes a cylindrical portion 40 and flange portions 41 formed on side surfaces of the cylindrical portion 40. The rollers 13 are arranged so that contact surfaces 42 are brought into contact with a region where a flat surface portion of the fin 30 moves and slides on the suction plate 12. Therefore, the rollers 13 cause the flange portions 41 to be partially exposed through the holes of the suction plate 12. It is preferred that the rollers 13 be made of the same material as the fin 30. For example, the material may include aluminum or aluminum alloy. Materials of the rollers 13 and the fin 30 are the same, therefore being capable of preventing adhesion of substances which are different from the fin 30 to the surface of the fin 30. However, the material of the rollers 13 may be different from that of the fin 30 in consideration of abrasion resistance achieving tolerance for a long-time use, contact property with the fin 30, or easiness in formation of grooves in the contact surface. Further, the rollers 13 necessarily need not be made of a single material.

Figure 3:
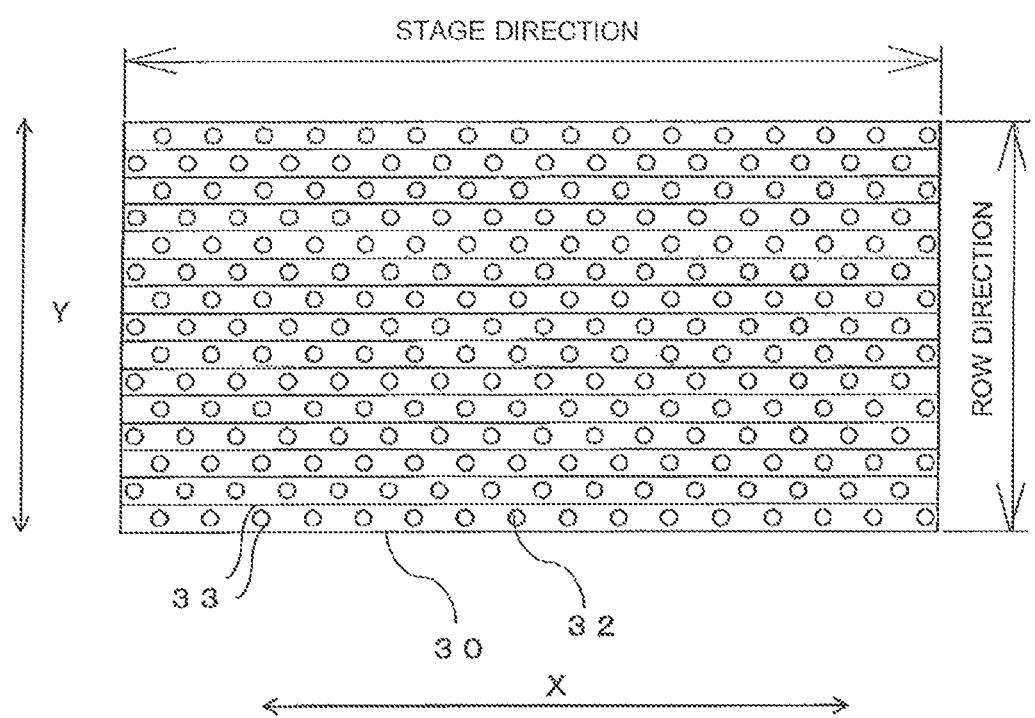
FIG. 3 is a top view of a fin of the fin stacking apparatus according to Embodiment 1 of the present invention.

FIG. 3 is a top view of the fin of the fin stacking apparatus according to Embodiment 1 of the present invention. As in the fin 30 illustrated in FIG. 3, the fin 30 which is conveyed from a press machine 2 is divided along a direction parallel to a advancing direction, that is, an X-direction. Further, the fin 30 has stacking holes 32 formed at predetermined intervals along the advancing direction, that is, the X-direction. The fin 30 has flat surface portions 33 between both edges of the fin 30 in a Y-direction and the stacking holes 32.

Next, an operation is described with reference to FIG. 1 to FIG. 3. First, suction by the blower 15 is started. The suction box 14 causes the suction by the blower 15 to act entirely on the suction plate 12. Next, the press machine 2 is started to deliver the fin 30 from the press machine 2.

Figure 4:
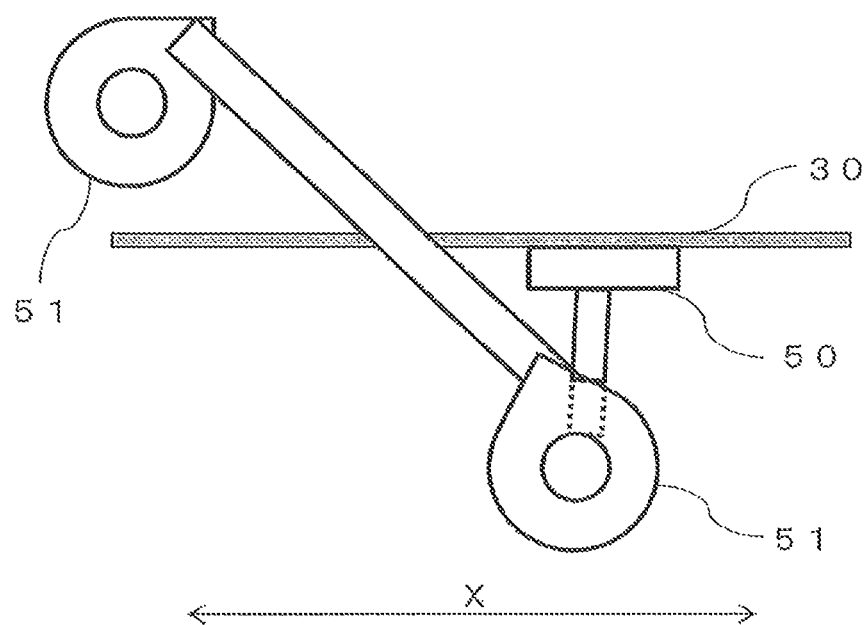
FIG. 4 is a view for illustrating a fin conveyance mechanism for conveyance of a fin by a press machine to the fin stacking apparatus according to Embodiment 1 of the present invention.
Figure 5:
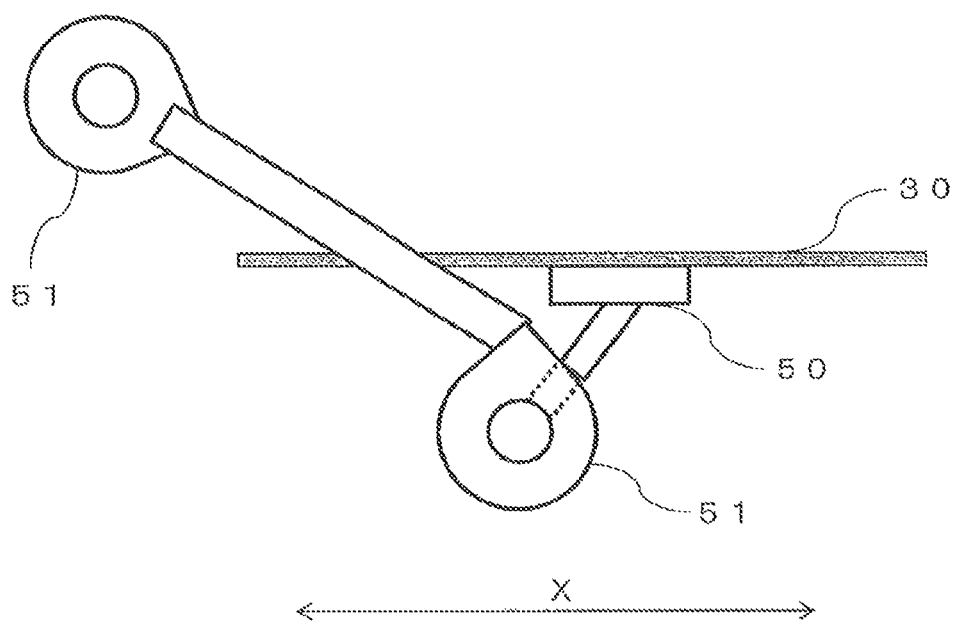
FIG. 5 is a view for illustrating the fin conveyance mechanism for conveyance of the fin by the press machine to the fin stacking apparatus according to Embodiment 1 of the present invention.

FIG. 4 and FIG. 5 are views for illustrating a fin conveyance mechanism for conveyance of the fin by the press machine to the fin stacking apparatus according to Embodiment 1 of the present invention. FIG. 4 and FIG. 5 are partial enlarged views of an inside of the press machine, and detailed illustration thereof is omitted. The movement of the fin 30 on the suction plate 12 is performed by the pushing force of the press machine 2.

Herein, a change in speed during the movement of the fin 30 is described. The delivery of the fin 30 by the press machine 2 is performed by a link mechanism using cams. FIG. 4 is an enlarged view for illustrating the link mechanism arranged in the press machine 2. FIG. 5 is a view for illustrating a state after rotation of cams 51 of FIG. 4. The conveyance of the fin 30 by the press machine 2 is performed through repetition of the state of FIG. 4 and the state of FIG. 5. Therefore, the fin 30 repeats acceleration and deceleration each time a fin conveyance portion 50 performs a reciprocating motion. The fin 30 moves with repetition of acceleration and deceleration each time the cams 51 of the press machine 2 perform one cycle of operation.

Figure 6:
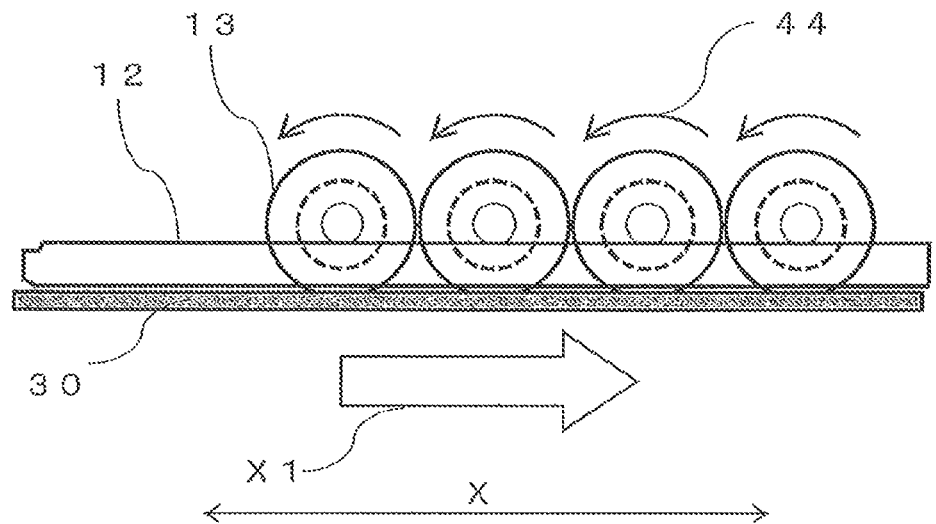
FIG. 6 is a partial front view for illustrating the fin stacking apparatus according to Embodiment 1 of the present invention during operation.
Figure 7:
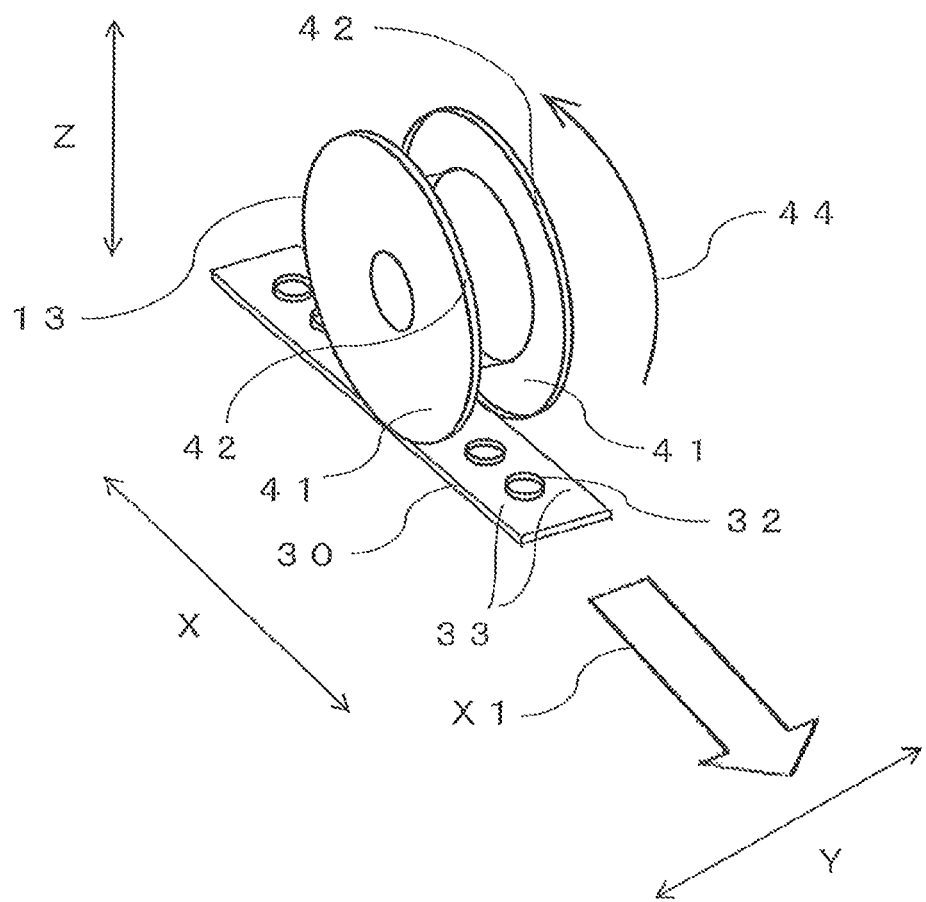
FIG. 7 is a partial enlarged perspective view for illustrating the fin stacking apparatus according to Embodiment 1 of the present invention during operation.

FIG. 6 is a partial front view for illustrating the fin stacking apparatus according to Embodiment 1 of the present invention during operation. FIG. 7 is a partial enlarged perspective view for illustrating the fin stacking apparatus according to Embodiment 1 of the present invention during operation. In FIG. 7, the suction plate 12 is omitted. The fin 30 delivered from the press machine 2 moves in the advancing direction under a state of being sucked to a lower surface of the suction plate 12. At this time, the flange portions 41 of the rollers 13 are brought into contact with the flat surface portions 33 of the fin 30 at the contact surfaces 42 being side surfaces, which are cylindrical peripheral surfaces of the flange portions 41 as illustrated in FIG. 7.

The fin 30 stably moves on the suction surface of the suction plate 12 by the rollers 13. The fin 30 having been delivered to a predetermined length is cut by a cutoff unit 3. Substantially at the same timing with the cutting, the suction operation by the blower 15 is stopped, and immediately thereafter, the suction plate 12 moves up and down in a vertical direction. After that, the fin 30 falls while being guided so that the stacking pins 23 penetrate through the stacking holes 32 illustrated in FIG. 3. Then, the fin 30 is placed on the elevator 22. The elevator 22 is positioned around an upper portion of the stacking pin 23, and the fallen fins 30 are sequentially stacked on the elevator 22. At this time, an uppermost surface of the stacked fins 31 is detected by a sensor (not shown), and the elevator 22 is lowered so that the uppermost surface is maintained at a certain position. The above-mentioned operation is repeated to proceed stacking.

In a case where a length of the fin 30 increases in the X-direction in FIG. 3, a frictional force, which is generated between the suction plate 12 and the fin 30 during the movement, increases. However, any length of the fin 30 can be employed by sequentially increasing the number of rollers 13 to be installed by the amount of increase in length of the fin 30. The same also applies with respect to an increase in number of fins 30 in a row direction.

As described above, the rollers 13 rotate during the operation of the fin stacking apparatus to reduce friction between the suction plate 12 and the fin 30. Accordingly, buckling of the fin 30 during the movement can be prevented so that stacking can be performed without any error. In the related-art fin stacking apparatus, there is a case where buckling may occur during the movement of the fin 30. As a result, there has been a disadvantage that the stacking pins 23 are not placed in the stacking holes 32 during the operation of the fin stacking apparatus, or that the fin 30 collides with the stacking pins 23 during the movement. However, in the fin stacking apparatus according to Embodiment 1 of the present invention, such a phenomenon can be prevented by rotating the rollers 13.

Embodiment 2

Figure 8:
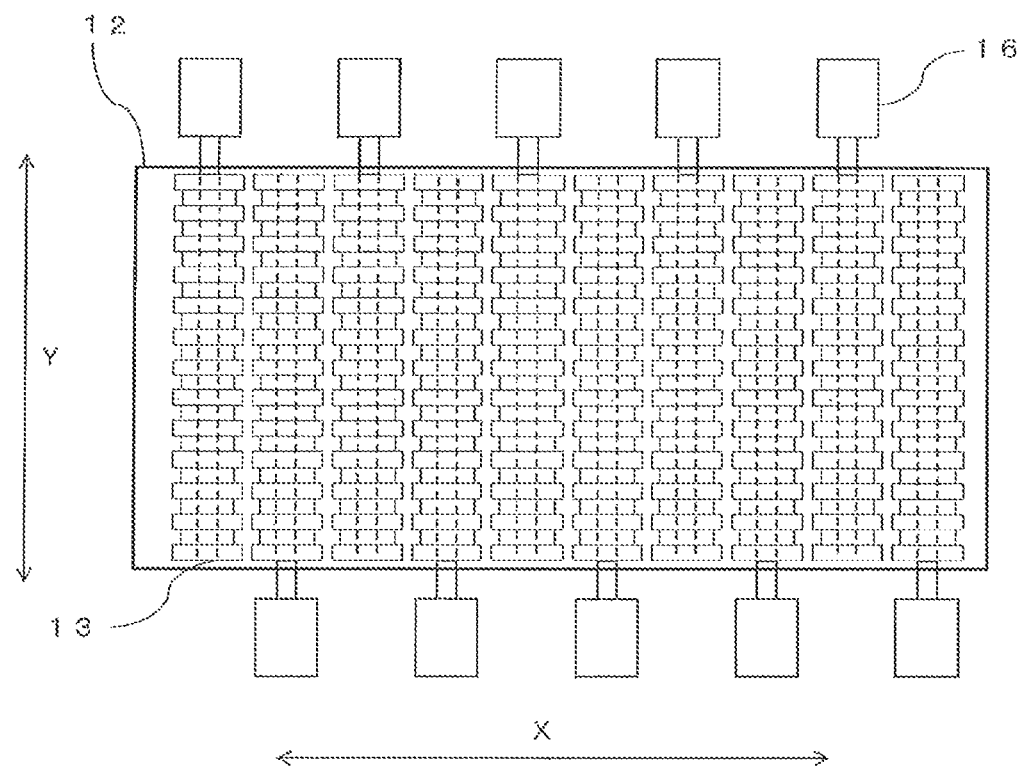
FIG. 8 is a top view of a fin stacking apparatus according to Embodiment 2 of the present invention.

FIG. 8 is a top view of a fin stacking apparatus according to Embodiment 2 of the present invention. In FIG. 8, the suction box 14 and the blower 15 are omitted. As illustrated in the top view of FIG. 8, motors 16 are connected to the rollers 13, and the rollers 13 are rotated by the motors 16 being drive sources. Further, the motors 16 are controlled in rotation speed by a motor controller 17. A position of the motor controller 17 may be set at any position, and is not limited to the position illustrated in FIG. 1. In the fin stacking apparatus according to Embodiment 1 of the present invention, the rollers 13 are freely rotated in accordance with the movement of the fin 30 in contact with the rollers 13. In Embodiment 2 of the present invention, description is made of a configuration in which the motors 16 are used to rotate the rollers 13 always at a constant speed to perform stacking. Other configurations of the fin stacking apparatus 1 are the same as those illustrated in FIG. 1 to FIG. 7.

First, the rollers 13 are rotated by driving of the motors 16. At the same time, the blower 15 starts suction. The suction box 14 causes the suction by the blower 15 to act entirely on the suction plate 12. Next, the press machine 2 is started to deliver the fin 30 from the press machine 2.

When the fin 30 is moved, the motor controller 17 controls the motors 16 so that the rollers 13 are always rotated at a speed which is equal to a maximum value of the moving speed of the fin 30 by the press machine 2. The motors 16 rotate the rollers 13 in a roller rotation direction 44 illustrated in FIG. 6 and FIG. 7, and the rollers 13 transmit a driving force (propulsion force) to the fin 30 in a fin advancing direction X1.

Figure 9:
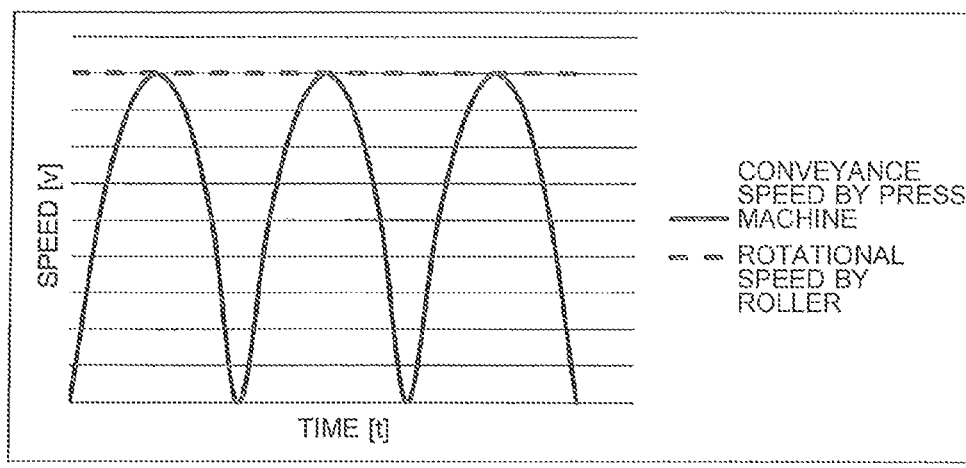
FIG. 9 is a graph for showing a relationship between a conveyance speed for conveyance of a fin by the press machine and a rotational speed by the roller in the fin stacking apparatus according to Embodiment 2 of the present invention.

FIG. 9 is a graph for showing a relationship between a conveyance speed for conveyance of the fin by the press machine and a rotational speed by the rollers in the fin stacking apparatus according to Embodiment 2 of the present invention. In a case where the moving speed of the fin 30 by the rollers 13 is lower than the conveyance speed by the press machine 2, there is a fear in that the contact surfaces 42 of the rollers 13 generate resistance against the movement of the fin to cause buckling. Thus, it is necessary to have a configuration by which the moving effect by the rollers 13 can be obtained in any state of the conveyance speed for conveyance of the fin 30 by the press machine 2. Therefore, in Embodiment 2 of the present invention, as illustrated in FIG. 9, the rotational speed of the rollers 13 with respect to the conveyance speed for conveyance of the fin 30 by the press machine 2 is controlled to be at a constant speed with a maximum value of the conveyance speed by the press machine 2 as a reference. Through the control method described above, a sufficient moving effect for movement of the fin 30 by the rollers 13 can be obtained.

As described above, the rollers 13 are always rotated at a constant rotation speed during the operation of the fin stacking apparatus to always perform the movement of the fin 30 by the press machine 2. As a result, buckling of the fin 30 during the movement can be prevented, and stacking can be performed without any error. In the related-art fin stacking apparatus, there has been a case of causing buckling of the fin 30 during the movement, and there has been a disadvantage that the stacking pins 23 are not placed in the stacking holes 32 during the operation of the fin stacking apparatus, or that the fin 30 collides with the stacking pins 23 during the movement. However, in the fin stacking apparatus according to Embodiment 2 of the present invention, such a phenomenon can be prevented by always rotating the rollers 13.

Embodiment 3

In the fin stacking apparatus according to Embodiment 2 of the present invention, stacking is performed under the state in which the rotational speed of the rollers 13 is always constant. In Embodiment 3 of the present invention, description is made of a configuration in which the rotational speed of the rollers 13 is changed during stacking. The configuration and operation of the fin stacking apparatus 1 itself is unchanged from those of Embodiment 2 of the present invention, and only the control method for the rotation speed of the motors 16 through use of the motor controller 17 is changed for use.

In Embodiment 2 of the present invention, as illustrated in FIG. 9, the rotational speed of the rollers 13 with respect to the conveyance speed for conveyance of the fin 30 by the press machine 2 is controlled to be at a constant speed with a maximum value of the conveyance speed by the press machine 2 as a reference. However, there may occur a difference between the conveyance speed by the press machine 2 and the rotational speed by the rollers 13 when the conveyance speed by the press machine 2 is not maximum. The sufficient moving effect can be obtained even in such a state. However, there is a fear of any disadvantage such as abrasion of the contact surfaces 42 of the rollers 13 due to the difference in the moving speed. Thus, it is assumed that the possibility of causing the disadvantage is reduced as the conveyance speed by the press machine 2 is close to the rotational speed by the rollers 13, thereby obtaining the moving effect by the rollers 13 in a stable state.

Figure 10:
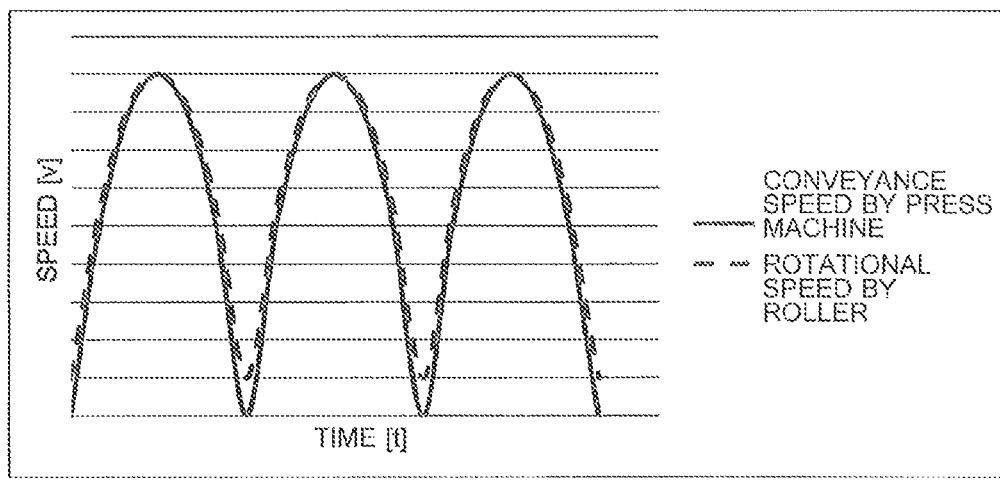
FIG. 10 is a graph for showing a relationship between a conveyance speed for conveyance of a fin by the press machine and a rotational speed by the roller in a fin stacking apparatus according to Embodiment 3 of the present invention.

FIG. 10 is a graph for showing a relationship between a conveyance speed for conveyance of the fin by the press machine and a rotational speed by the rollers in a fin stacking apparatus according to Embodiment 3 of the present invention. Through the control of the motors 16, as illustrated in FIG. 10, the rotation speed of the motors 16 is changed in accordance with the change in conveyance speed for conveyance of the fin 30 by the press machine 2 to change the rotational speed of the rollers 13, thereby being capable of achieving the movement of the fin 30 in a more stable state. For example, the control for the rotation speed of the motors 16 may be performed in accordance with the moving speed of the fin 30 through use of a sensor (not shown). Alternatively, the change in conveyance speed by the press machine 2 may be obtained in advance as data, and the data may be used for the control for the rotation speed of the motor 16. Further, the plurality of rollers 13, which are arrayed in the slide region of the suction plate 12 where the flat surface portion of the fin moves, may be set in advance so that the rotational speed of the rollers 13 is increased in the moving direction of the fin. That is, the rollers have rotational speeds different from each other.

As described above, the movement of the fin 30 can be more stabilized by changing the rotation speed of the motor 16 in accordance with the change in conveyance speed for conveyance of the fin 30 by the press machine 2 during the operation of the fin stacking apparatus to change the rotational speed of the rollers 13. Through the more stabilized movement of the fin 30, buckling of the fin 30 during the movement can be prevented, and stacking can be performed without any error.

Embodiment 4

Figure 11:
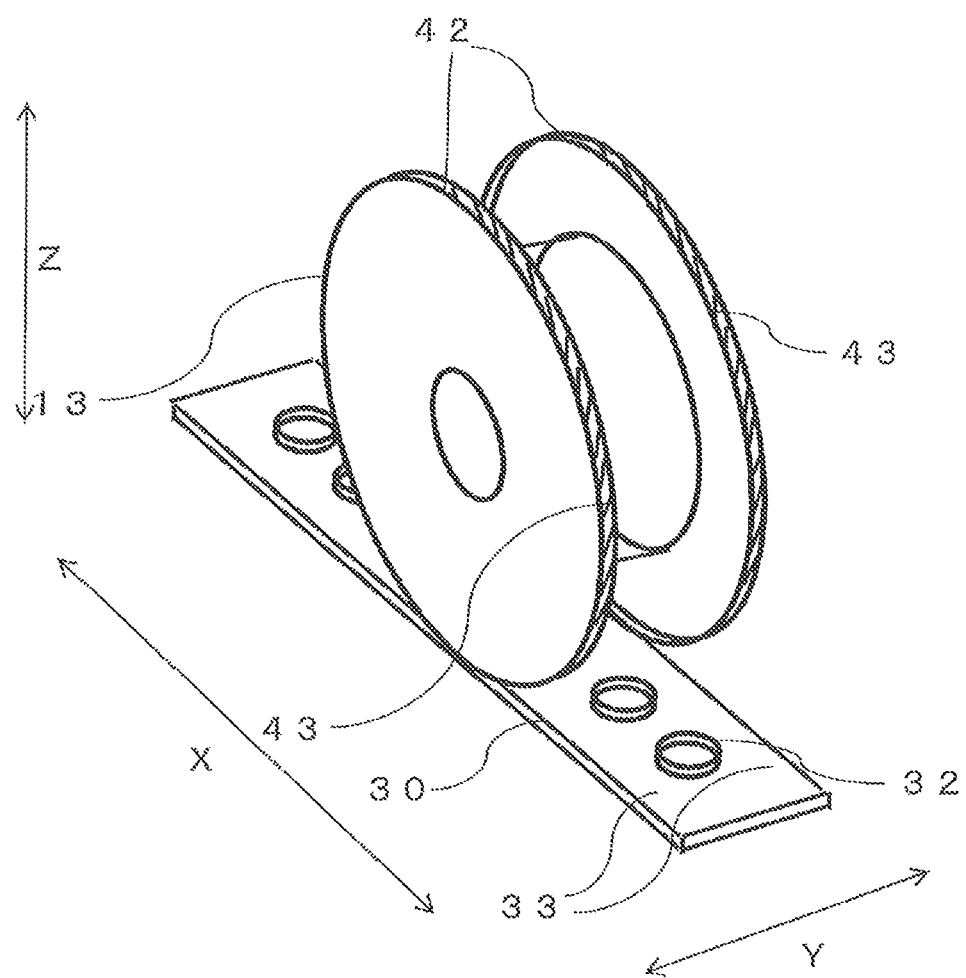
FIG. 11 is a view for illustrating an example of grooves added to contact surfaces of the rollers of a fin stacking apparatus according to Embodiment 4 of the present invention.

FIG. 11 is a view for illustrating an example of grooves added to the contact surfaces of the rollers of the fin stacking apparatus according to Embodiment 4 of the present invention. In Embodiments 1 to 3 of the present invention, the contact surfaces 42 of the rollers 13 are flat surfaces. In Embodiment 4 of the present invention, description is made of a case where grooves 43 are added to the contact surfaces 42 of the rollers 13. The configuration and operation of the fin stacking apparatus itself are unchanged, and only the contact surfaces 42 of the rollers 13 are changed for use.

The rollers 13 of the fin stacking apparatus 1 give a driving force in the fin advancing direction X1 to the fin 30, which moves on the suction plate, by a frictional force between the contact surfaces 42 and the contact surfaces of the fin 30. The grooves 43 are added to the contact surfaces 42 of the rollers 13 to increase the frictional force with respect to the contact surfaces of the fin 30, thereby giving a larger driving force to the fin 30. For example, the grooves 43 having an inclination with respect to a Y-axis is formed at equal intervals in the contact surfaces 42 of the rollers 13 as illustrated in FIG. 11.

Protrusions and recesses are formed in the contact surfaces 42 of the rollers 13. Thus, it is assumed that the frictional force generated between the rollers 13 and the fin 30 is increased, and the rollers 13 can accurately hold the fin 30. Therefore, the moving effect by the rollers 13 with respect to the conveyance of the fin 30 by the press machine is increased, thereby further improving the stackability.

The present invention is not limited to the above-mentioned embodiments. Further, components of the embodiments include components which are replaceable and are obvious to be replaced while maintaining the identity of the invention. Further, the plurality of modification examples described in the embodiments can be combined as appropriate within the range which is obvious to a person skilled in the art. For example, in the embodiments of the present invention, the flange portions are formed on side surfaces of the cylindrical portion of the roller. However, a cylindrical shape having only the cylindrical portion may also be employed. Further, the grooves having an inclination with respect to the Y-axis and being arranged at equal intervals in Embodiment 4 of the present invention may be parallel to the Y-axis.

REFERENCE SIGNS LIST 1 fin stacking apparatus 2 press machine 3 cutoff unit 10 suction unit 12 suction plate 13 roller 14 suction box 15 blower 16 motor 17 motor controller 20 fin stacking unit 21 base 22 elevator 23 stacking pin 30 fin 31 stacked fins 32 stacking hole 33 flat surface portion 40 cylindrical portion 41 flange portion 42 contact surface 43 groove 44 roller rotation direction 50 fin conveyance portion 51 cam

The invention claimed is:

1. A fin stacking apparatus configured to stack a fin having a flat-plate shape and a plurality of holes formed therein, comprising:
   a plurality of stacking pins to be inserted through the plurality of holes of the fin;
   a suction plate arranged above the plurality of stacking pins and configured to suck the fin; and
   a roller arranged in a slide region on the suction plate where a flat surface portion of the fin moves, wherein
   the roller includes flange portions having respective cylindrical peripheral surfaces, and the cylindrical peripheral surfaces are brought into contact with the fin, and
   the roller has grooves formed in the cylindrical peripheral surfaces.

2. The fin stacking apparatus of claim 1, wherein the roller is made of a same material as the fin.

3. The fin stacking apparatus of claim 1, further comprising a motor connected to the roller.

4. The fin stacking apparatus of claim 3, further comprising a motor controller configured to change a rotational speed of the roller.

5. The fin stacking apparatus of claim 4, wherein the rotational speed of the roller is determined based on a conveyance speed for conveyance of the fin delivered from a press machine.

6. The fin stacking apparatus of claim 3, wherein
   the roller comprises a plurality of rollers arrayed in the slide region, and
   the rollers have rotational speeds different from each other.

* * * * *